US008239600B2

(12) United States Patent
Yamamoto et al.

(10) Patent No.: US 8,239,600 B2
(45) Date of Patent: Aug. 7, 2012

(54) DATA PROCESSING SYSTEM WITH SELECTABLE INTERRUPT CONTROL

(75) Inventors: Akihiro Yamamoto, Tokyo (JP); Yasuhiko Hoshi, Tokyo (JP); Hiroyuki Hamasaki, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 312 days.

(21) Appl. No.: 12/558,508

(22) Filed: Sep. 12, 2009

(65) Prior Publication Data
US 2010/0088445 A1 Apr. 8, 2010

(30) Foreign Application Priority Data
Oct. 2, 2008 (JP) ................................. 2008-257278

(51) Int. Cl.
*G06F 13/26* (2006.01)
(52) U.S. Cl. .................... 710/264; 710/261; 710/267
(58) Field of Classification Search ........... 710/260–269
See application file for complete search history.

(56) References Cited

U.S. PATENT DOCUMENTS

| 4,959,781 | A | * | 9/1990 | Rubinstein et al. ........... 710/262 |
| 5,109,513 | A | * | 4/1992 | Otsuka ........................... 710/269 |
| 5,469,570 | A | * | 11/1995 | Shibata ........................... 717/124 |
| 5,511,200 | A | * | 4/1996 | Jayakumar ..................... 710/266 |
| 5,987,556 | A | * | 11/1999 | Nakagawa et al. ........... 710/305 |
| 6,237,058 | B1 | * | 5/2001 | Nakagawa ..................... 710/260 |
| 6,430,643 | B1 | * | 8/2002 | Arndt ............................. 710/263 |
| 6,711,643 | B2 | * | 3/2004 | Park et al. ..................... 710/260 |
| 6,748,742 | B2 | * | 6/2004 | Rouse et al. ..................... 60/611 |
| 7,275,122 | B2 | * | 9/2007 | Wright et al. ................. 710/267 |
| 7,610,425 | B2 | * | 10/2009 | Solomita et al. ............. 710/260 |
| 7,849,247 | B2 | * | 12/2010 | Marietta et al. .............. 710/264 |
| 2002/0120802 | A1 | * | 8/2002 | Knudsen ....................... 710/260 |
| 2003/0120702 | A1 | * | 6/2003 | Jahnke .......................... 709/102 |
| 2004/0068598 | A1 | * | 4/2004 | Sakugawa ..................... 710/260 |
| 2006/0112208 | A1 | * | 5/2006 | Accapadi et al. ............. 710/265 |

FOREIGN PATENT DOCUMENTS
JP 63-163656 A 7/1988
* cited by examiner

*Primary Examiner* — Raymond Phan
(74) *Attorney, Agent, or Firm* — Miles & Stockbridge P.C.

(57) ABSTRACT

The present invention provides a data processing system having excellent immediacy of interrupting process. Different interrupt request signals are supplied from a circuit module which can be commonly used by a plurality of central processing units to a plurality of interrupt controllers assigned to central processing units, respectively. In response to the input interrupt request signal, each of the interrupt controllers notifies the corresponding central processing unit of an interrupt. The circuit module selects an interrupt controller for supplying an interrupt request signal from the plural interrupt controllers. For example, the circuit module identifies a central processing unit which instructed a start request and supplies an interrupt request signal to an interrupt controller corresponding to the central processing unit. The burden of the interrupting process of the single central processing unit can be lessened. In addition, since the interrupting process in the single central processing unit is not necessary, interruption response of another central processing unit is increased.

7 Claims, 8 Drawing Sheets

DATA PROCESSING SYSTEM WITH SELECTABLE INTERRUPT CONTROL

CROSS-REFERENCE TO RELATED APPLICATIONS

The disclosure of Japanese Patent Application No. 2008-257278 filed on Oct. 2, 2008 including the specification, drawings and abstract is incorporated herein by reference in its entirety.

BACKGROUND OF THE INVENTION

The present invention relates to an interruption control technique in a data processing system having a plurality of central processing units and an accelerator and, for example, relates to a technique effectively applied to a system-on-chip semiconductor integrated circuit.

In a data processing system, to lessen the burden on a central processing unit (also simply described as CPU), an accelerator for performing specific data processes such as image recognition and coding/decoding of image data is mounted, and a sub-CPU to lessen the burden with respect to control on the accelerator is also mounted, thereby improving the performance as a whole. The interruption control in the multiple CPU has the following modes.

In a first mode, in the case where the accelerator can issue an interrupt request signal only to an interrupt controller on the main CPU side, to interrupt the sub-CPU by the accelerator, the accelerator has to interrupt the main CPU and cause interruption in the sub-CPU, use an interrupt routine of the main CPU, and interrupt the sub-CPU. On the other hand, in the case where the accelerator can issue an interrupt request signal only to an interrupt controller on the sub-CPU side, to interrupt the main CPU, the accelerator has to interrupt the sub-CPU and cause interruption in the main CPU by using an interrupt routine of the sub-CPU.

In a second mode, an interrupt mask register corresponding to each CPU is prepared, and only the interrupt mask corresponding to a CPU to be interrupted is cancelled by software. Even if the accelerator issues an interruption to all of the CPUs, only the CPU whose mask is cancelled is interrupted. Japanese Unexamined Patent Publication No. Sho 63 (1988)-163656 discloses a technique called a floating interrupt mechanism as an interrupt control technique classified to the second mode.

As a third mode, an interrupt priority corresponding to each CPU is set, and the accelerator issues an interrupt to all of the CPUs. When an interrupt is issued, the CPU determines whether or not it should receive the interrupt or not on the basis of its interrupt priority. At the time point when one CPU accepts the interrupt, acceptance of the interrupt by the other CPUs is masked.

SUMMARY OF THE INVENTION

The inventors of the present invention have made clear that the interrupt control modes in the multiple CPUs have the following problems.

In the first mode, a required CPU is interrupted via the interrupt process routine of another CPU, so that immediacy of the interrupting process is low.

In the second and third modes, software process using a specific CPU is necessary for the mask setting and the priority setting. A burden is imposed on the specific CPU, and the immediacy of the interrupting process becomes low. When the process of the system changes, the software process also changes. Since compatibility of the software is extremely low, and a burden to generate the software is also heavy.

An object of the present invention is to provide a data processing system having excellent immediacy of interrupting process and a semiconductor integrated circuit as a component of the system.

The above and other objects and novel features of the present invention will become apparent from the description of the specification and the appended drawings.

Outline of representative ones of inventions disclosed in the application will be briefly described as follows.

An interrupt request signal is supplied from a circuit module which can be commonly used by a plurality of interrupt controllers assigned to central processing units to each of the plural interrupt controllers, and the interrupt controller notifies the corresponding central processing unit of an interrupt in response to the input interrupt request signal. At this time, the circuit module selects an interrupt controller for supplying an interrupt request signal from the plural interrupt controllers. For example, the circuit module identifies the central processing unit which instructed the start request, and supplies the interrupt request signal to the interrupt controller corresponding to the central processing unit.

With the means, as compared with the case where a single central processing unit processes all of interruptions, since the circuit module can directly interrupt another central processing unit, the burden of the interrupting process of the single central processing unit can be lessened. In addition, the interrupting process in the single central processing unit is not necessary for the direct interruption, so that interruption response of the another central processing unit is increased.

An effect obtained by the representative ones of the inventions disclosed in the application will be briefly described as follows.

In short, immediacy of the interrupting process is excellent.

DETAILED DESCRIPTION OF THE PREFERRED EMBODIMENTS

1. Outline of Embodiments

First, outline of representative embodiments of the present invention disclosed in the application will be described. Reference numerals in parentheses in the diagrams referred to in the outline explanation of the representative embodiments just illustrate components included in the concept of the components.

1. A data processing system (1) according to the present invention includes: a plurality of central processing units (2, 3); a plurality of interrupt controllers (4, 6) assigned to the central processing units in a one-to-one corresponding manner; and a circuit module (9) which can be commonly used by the plural central processing units. Different interrupt request signals (IRQ1M, IRQ1S) are supplied from the circuit module to the plural interrupt controllers, and each of the interrupt controllers notifies the corresponding central processing unit of an interrupt in response to the input interrupt request signal. The circuit module selects an interrupt controller for supplying an interrupt request signal from the plural interrupt controllers.

With the means, as compared with the case where a single central processing unit processes all of interruptions, since the circuit module can directly interrupt another central processing unit, the burden of the interrupting process of the single central processing unit can be lessened. In addition, the interrupting process in the single central processing unit is not necessary for the direct interruption, so that interruption response of the other central processing units is increased. As a result, response to an interrupt improves.

In contrast with the case of interrupting all of the central processing units, since the circuit module itself determines the interrupt issue destination, mask setting to a central processing unit by software is unnecessary.

Since it is unnecessary to recreate a mask register and software (interrupt routine) in accordance with the number of central processing units and circuit modules, reusability, that is, compatibility of software related to an interrupting process when the same circuit module is used for different products increases.

Since the interrupt issue destination can be discriminated by the circuit module itself, the optimum interrupt issue destination can be selected. For example, a central processing unit having low burden can be selectively interrupted.

Since the circuit module itself discriminates the interrupt issue destination, it is sufficient for the central processing unit to accept an interrupt issued to the central processing unit itself regardless of the data process state of the other central processing units. It can contribute to simplification of hardware for interrupt control.

2. In the data processing system (1), the circuit module generates an interrupt request signal at the end of a process of responding to an issued start request, on occurrence of an error during the responding process, and at the timing of notifying of a status of the responding process.

3. In the data processing system (1), the circuit module outputs the interrupt request signal toward an interrupt controller corresponding to a central processing unit which issued a start request. As a result, the correlation between the start request to the circuit module and use of the result of started process can be respected.

4. In the data processing system (3), the circuit module has a first register (22) that holds identification data which is output from a central processing unit as an issuer of a start request when the start request is issued, and an interrupt controller corresponding to the identification data held in the first register is set as an output destination of the interrupt request signal.

5. In the data processing system of (1), wherein the circuit module outputs an interrupt request signal toward a single interrupt controller which is preliminarily determined regardless of an interrupt controller corresponding to a central processing unit which issued a start request or a central processing unit which issued a start request in accordance with a set value of a second register (37). With the arrangement, compatibility with software operating in a system having only one interrupt controller can be easily obtained.

6. In the data processing system (5), the circuit module has a first register that holds identification data output from a central processing unit as an issuer of a start request when the start request is issued. When a first value is set in the second register, an interrupt controller corresponding to the identification data held in the first register is set as an output destination of an interrupt request signal.

7. In the data processing system (5), the circuit module has a third register (38, 39) that designates a single interrupt controller for outputting an interrupt request signal regardless of a central processing unit which issued a start request. When a second value is set in the second register, an interrupt controller designated by the set value in the third register is set as an output destination of an interrupt request signal.

8. In the data processing system (1), the circuit module determines operation margin in data process in the plural central processing units, and sets an interrupt controller on the side of a central processing unit having large operation margin as an output destination of an interrupt request signal. With the configuration, the system efficiency can be improved.

9. In the data processing system (8), the circuit module receives temperature data obtained by measuring temperatures of the plural central processing units and determines that the lower the temperature is, the larger the operation margin in the data process is.

10. A semiconductor integrated circuit according to the invention has: a plurality of central processing units; a plurality of interrupt controllers assigned to the central processing units in a one-to-one corresponding manner; and an accelerator which can be commonly used by the plural central processing units. Different interrupt request signals are supplied from the accelerator to the plural interrupt controllers, and each of the interrupt controllers notifies the corresponding central processing unit of an interrupt in response to the input interrupt request signal. The accelerator outputs an interrupt request signal toward an interrupt controller corresponding to a central processing unit which issued a start request.

11. In the semiconductor integrated circuit (10), the accelerator performs a data process of extracting a characteristic of image data. The plural central processing units perform a data process of recognizing an image of image data on the basis of the extracted characteristic.

12. A semiconductor integrated circuit according to the invention includes: a plurality of central processing units; a plurality of interrupt controllers assigned to the central processing units in a one-to-one corresponding manner; and an accelerator which can be commonly used by the plural central processing units. Different interrupt request signals are supplied from the accelerator to the plural interrupt controllers, and each of the interrupt controllers notifies the corresponding central processing unit of an interrupt in response to the input interrupt request signal. The accelerator outputs an interrupt request signal toward an interrupt controller which is preliminarily determined regardless of an interrupt controller corresponding to a central processing unit which issued a start request or a central processing unit which issued a start request in accordance with a set value in a register.

13. A semiconductor integrated circuit according to the invention includes: a plurality of central processing units; a plurality of interrupt controllers assigned to the central processing units in a one-to-one corresponding manner; and an accelerator which can be commonly used by the plural central processing units. Different interrupt request signals are supplied from the accelerator to the plural interrupt controllers and each of the interrupt controllers notifies the corresponding central processing unit of an interrupt in response to the input interrupt request signal. The accelerator determines operation margin in data process in the plural central processing units, and selects an interrupt controller on the side of a central processing unit having large operation margin as an output destination of an interrupt request signal.

2. Details of Embodiments

The embodiments will be described in more details. The forms for carrying out the present invention will be described in detail below with reference to the drawings. In all of the drawings for explaining the forms for carrying out the invention, the same reference numerals are designated to components having the same function and repetitive description will not be given.

Figure 1:
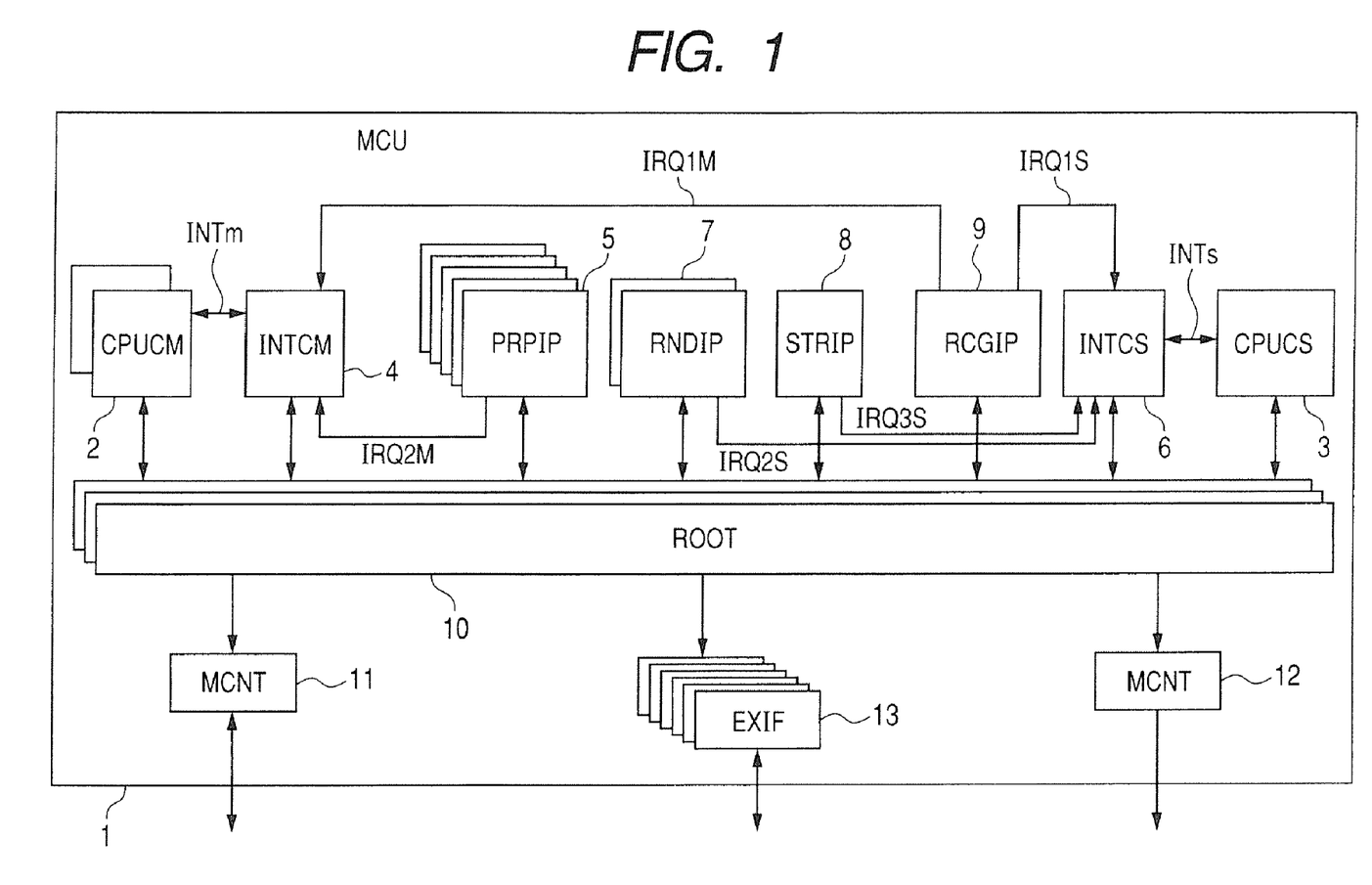
FIG. 1 is a block diagram illustrating a data processing system according to the present invention.

FIG. 1 illustrates a data processing system (data processing apparatus) according to the present invention. The data processing system shown in the diagram is, though not limited, a system-on-chip microcomputer specialized for image process, and is formed on a single semiconductor substrate made of single-crystal silicon or the like by the CMOS integrated circuit manufacturing technique or the like.

A data processing system 1 has, although not limited, a master central processing unit (CPUCM) 2 and a sub central processing unit (CPUCS) 3 as a dual processor core (multi-processor core). An interrupt controller (INTCM) 4 is arranged in correspondence with the CPUCM 2, and an interrupt controller (INTCS) 6 is arranged in correspondence with the CPUCS 3. Each of the central processing units 2 and 3 has, although not limited, an instruction control unit, an instruction execution unit, and a bus interface and may have, in addition, a cache memory, an address conversion buffer, and a floating-point arithmetic unit. The data processing system has some peripheral circuits (PRPIP) 5 and, as accelerators (circuit modules), for example, an image drawing accelerator 7, a strain correcting accelerator (STRIP) 8, and an image recognizing accelerator (RCGIP) 9 and also has memory controllers (MCNT) 11 and 12 and an external interface circuit 13. The circuits can transmit/receive data, addresses, and control signals via a router (ROOT) 10. For the data transmission/reception using the router 10, for example, a protocol of a split transaction bus for transferring data on a packet unit basis can be employed.

The accelerator 7 receives a start command from the CPUCS 3 and performs image drawing to lessen the burden on the CPUCS 3. Similarly, the accelerator 8 performs image strain correction computation. The accelerator 9 receives a start command from the CPUCM 2 or the CPUCS 3 and performs a characteristic extracting process for image recognition in order to lessen the burden on the CPUCS 3. To each of the memory controllers 11 and 12, a synchronous DRAM conformed with the standard of, for example, DDR3 is coupled on the outside.

For the CPUs 2 and 3, the interrupt controllers 4 and 6 are arranged, respectively. The interrupt controller 4 receives interrupt request signals IRQ1M and IRQ2M illustrated as representatives and determines the mask level for an interrupt request by the interrupt request signal. When the interrupt requests compete, the interrupt controller 4 adjusts the interruption requests in accordance with the interrupt priority level and supplies an interrupt signal INTm and an interrupt cause code (not shown) to, for example, the CPUCM 2. The interrupt controller 6 receives interrupt request signals IRQ1S, IRQ2S, and IRQ3S illustrated as representatives and determines the mask level for an interrupt request by the interrupt request signal. When the interrupt requests compete, the interrupt controller 6 adjusts the interruption requests in accordance with the interrupt priority level and supplies an interrupt signal INTs and an interrupt cause code (not shown) to, for example, the CPUCS 2.

When an interrupt request event occurs due to the data process, the image recognition accelerator 9 selects to output either the interrupt request signal IRQ1M to the interrupt controller 4 on the CPUCM 2 side or the interrupt request signal IRQ1S to the interrupt controller 6 on the CPUCS 3 side. The interrupt request event occurs, for example, at the end of a process of responding to a start request by a command, occurrence of an error during the responding process, or at the timing of notifying of a status of the responding process.

Figure 2:
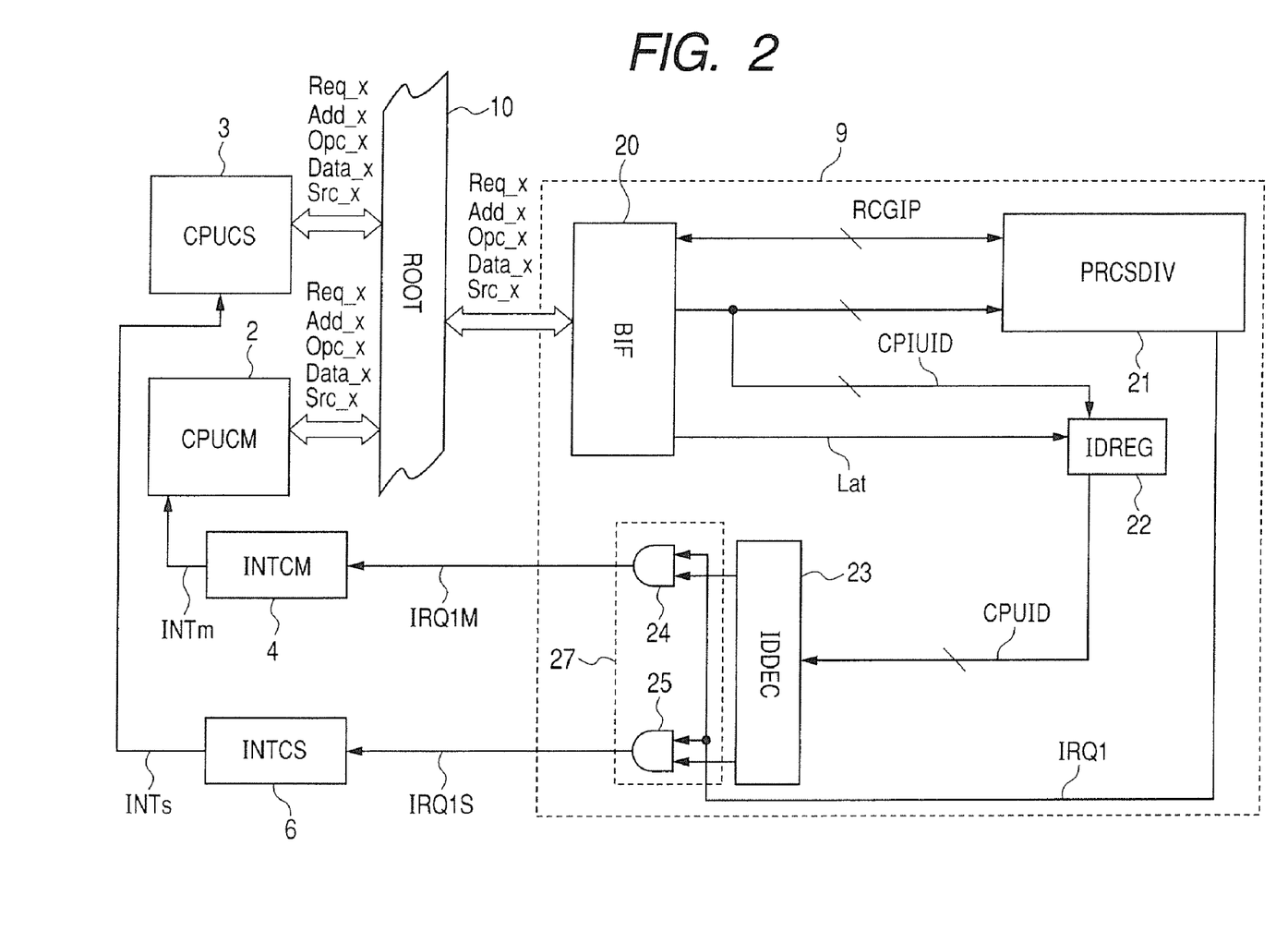
FIG. 2 is a block diagram illustrating a configuration for outputting an interrupt request signal toward an interrupt controller corresponding to a central processing unit which issued a request for starting an image recognizing operation as a first example of an image recognition accelerator.

FIG. 2 illustrates a configuration for outputting an interrupt request signal toward an interrupt controller corresponding to a central processing unit which issued a request for starting an image recognizing operation as a first example of the image recognition accelerator 9.

The image recognition accelerator 9 has, for example, a bus interface (BIF) 20, an image recognition processor (PRCS-DIV) 21, an ID register (IDREG) 22, a decoder (IDDEC) 23, and AND gates 24 and 25. A start request (STRREQ) to the image recognition accelerator 9 is instructed by an access request signal Req_x, address data Add_x designating a start register, operation data Opc_x instructing an operation, a start bit Data_x, and a CPU identification signal Src_x indicative of a central processing unit as a starter which are issued from the CPUCM 2 or CPUCS 3 to the router 10. The bus interface 20 receives the signals and determines that an operation of the image recognition accelerator 9 is selected, and transfers information necessary to perform an image recognizing process instructed to start by the determination to the image recognition processor 21. In response to the information, the image recognition processor 21 starts the image recognizing process. When the bus interface 20 determines that the operation of the image recognition accelerator 9 is selected, in addition, the bus interface 20 activates a latch signal Lat and makes the ID register 22 hold CPU identification data CPUID designated by the CPU identification signal Src_x. The CPU identification data CPUID is decoded by the decoder 23 and a decoding result is supplied to the AND gates 24 and 25. When the CPU identification data CPUID indicates CPUCM4, an output to the AND gate 24 is set to the high level. When the CPU identification data CPUID indicates CPUCS6, an output to the AND gate 25 is set to the high level. The image recognition processor 21 sets the interrupt instruction signal IRQ1 to the high level at the end of the process of responding to the start request, occurrence of an error during the responding process, and at the timing of notifying of the status of the responding process. When the interrupt instruction signal IRQ1 is activated in response to the high level, an interrupt request signal is output to the interrupt controller corresponding to one of the central processing units indicated by the CPU identification data CPUID, and the interrupt request to the interrupt controller corresponding to the other central processing unit is masked.

Figure 3:
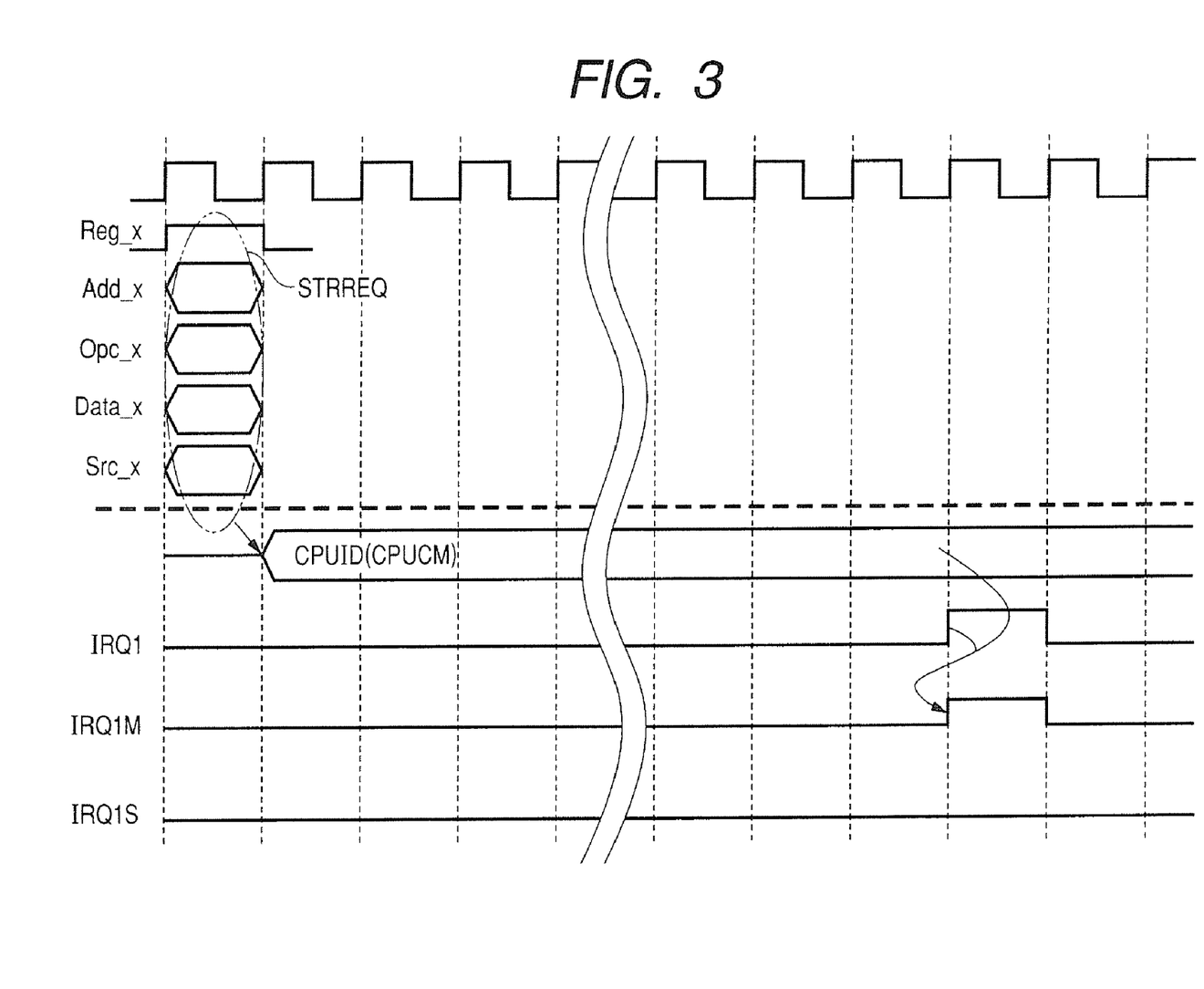
FIG. 3 is an operation timing chart of the image recognition accelerator.

FIG. 3 illustrates operation timings of the image recognition accelerator. Since the master central processing unit (CPUCM) 2 starts the operation of the image recognition accelerator 9 in this case, the CPU identification data CPUID designated by the CPU identification signal Src_x indicates the master central processing unit (CPUCM) 2. Therefore, when the interrupt instruction signal IRQ1 is set to the high level, the interrupt request signal IRQ1M is activated, activation of the interrupt request signal IRQ1S is masked, and an interrupt based on the end of the image recognizing process or the like is issued toward the master central processing unit 2 which has issued the start request.

Figure 4:
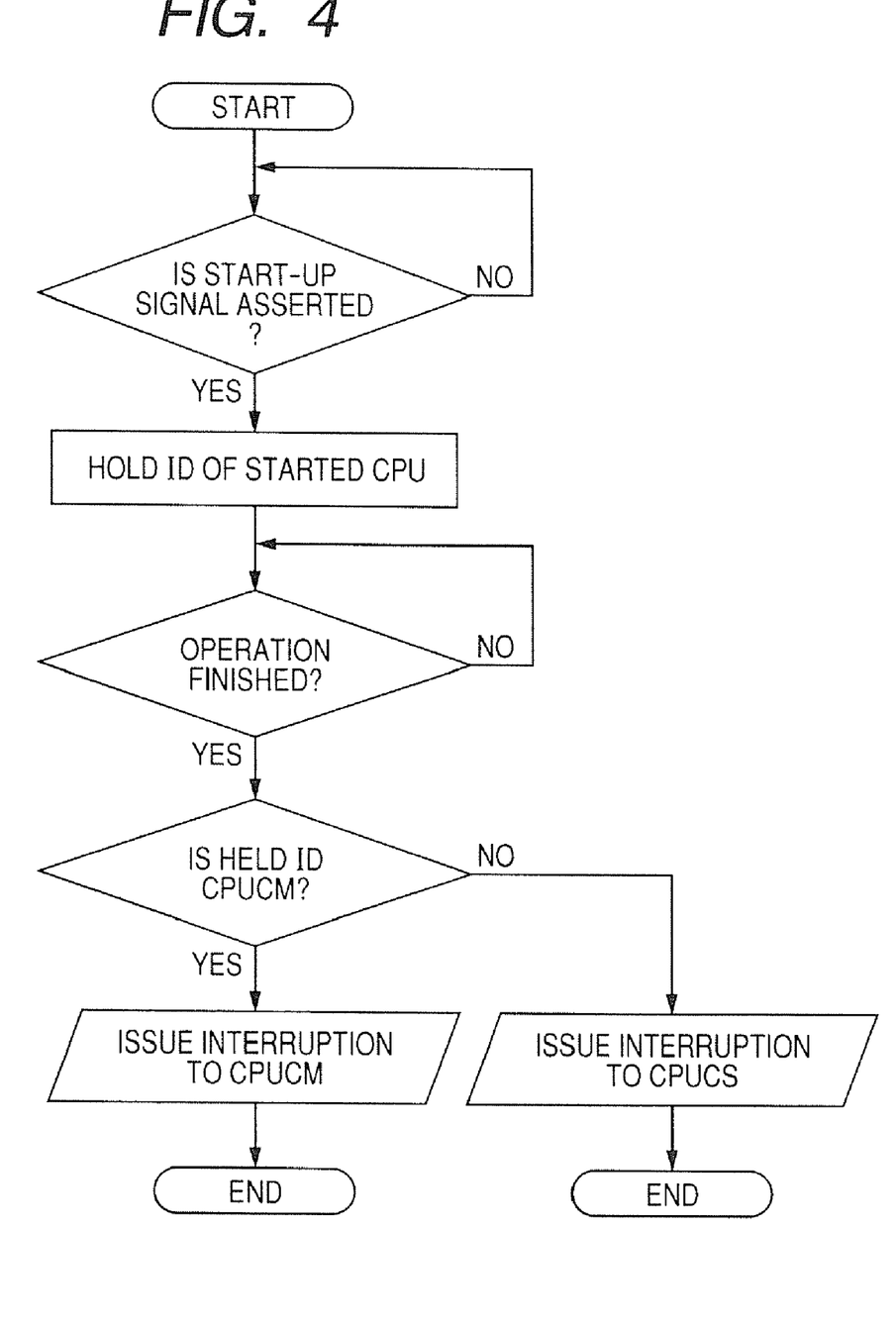
FIG. 4 is an operation flowchart of the image recognition accelerator.

FIG. 4 illustrates an operation flowchart of the image recognition accelerator. As described above, an interrupt is issued toward a central processing unit which has sent a start request.

Figure 5:
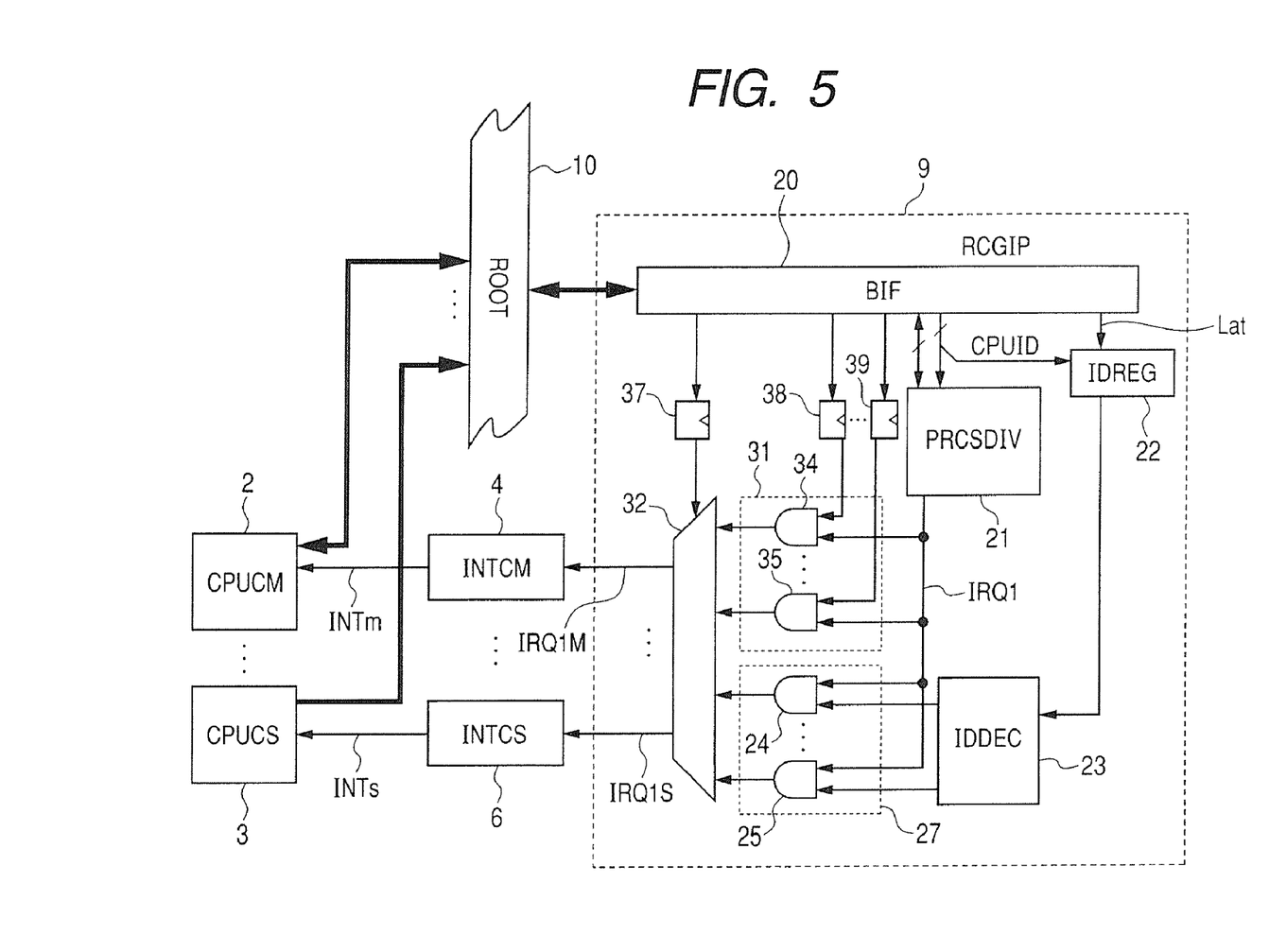
FIG. 5 is a block diagram illustrating a configuration for outputting an interrupt request signal toward a single interrupt controller which is preliminarily determined regardless of an interrupt controller corresponding to a central processing unit which issued a start request or the central processing unit which issued a start request as a second example of the image recognition accelerator.

FIG. 5 illustrates a configuration for outputting an interrupt request signal toward a single interrupt controller which is preliminarily determined regardless of an interrupt controller corresponding to a central processing unit which issued a start request or the central processing unit which issued a start request as a second example of the image recognition accelerator 9.

The image recognition accelerator 9 of FIG. 5 has a configuration obtained by adding registers 37, 38, and 39 and selectors 31 and 32 to the configuration of FIG. 4. The selector 31 is made of 2-input AND gates 34 and 35. To one of inputs of the AND gates 34 and 35, the interrupt instruction signal IRQ1 is supplied. To the other input of the AND gates 34 and 35, selection instruction bits set in the registers 38 and 39 are supplied. Only one of the selection instruction bits in the registers 38 and 39 is selectively set to logic value 1. When the selection instruction bit in the register 37 is set to the logic value 1, the selector 32 sets the output of the AND gate 34 to the interrupt request signal IRQ1M and sets the output of the AND gate 35 to the interrupt request signal IRQ1S. On the other hand, when the selection instruction bit in the register 37 is set to the logic value 0, the selector 32 sets the output of the AND gate 24 to the interrupt request signal IRQ1M and sets the output of the AND gate 25 to the interrupt request signal IRQ1S. Either the CPUCM 2 or CPUCS 3 performs selection of the registers 37, 38, and 39 in accordance with the operation program, and sets a selection instruction bit. Therefore, in the case where it is desired to issue an interrupt to a central processing unit which has issued a start request, it is sufficient to set the selection instruction bit of the register 37 to the logic value 0. In the case where it is desired to fix the central processing unit as a destination of the interrupt request, it is sufficient to set the selection instruction bit of the register 37 to the logic value 1. In the case of fixing the interrupt request destination to the CPUCM 2, it is sufficient to set the selection instruction bit of the register 38 to the logic value 1 and set the selection instruction bit of the register 39 to the logic value 0. In the case of fixing the interrupt request destination to the CPUCS 3, it is sufficient to the set the selection instruction bit of the register 38 to the logic value 0 and set the selection instruction bit of the register 39 to the logic value 1.

With the first and second configurations of the image recognition accelerator 9, the following effects can be obtained.

(1) With the means, as compared with the case where the single central processing unit 2 processes all of interruptions, since the image recognition accelerator 9 can also directly interrupt the another central processing unit 3, the burden of the interrupting process of the single central processing unit 2 can be lessened. In addition, in the case where the image recognizing process is started by another central processing unit 3, the interrupting process in the single central processing unit 2 is not necessary, so that interruption response of the another central processing unit 3 is increased. As a result, response to an interrupt can be improved. For example, in the case where a single interrupt controller 4 receives and processes all of interrupt requests, when the central processing unit 3 starts the image recognition accelerator 9 and, at the end of the process, the central processing unit 2 which is different from the start requester is interrupted, the central processing unit 2 has to perform a process of responding to the interrupt, notify the central processing unit as the start requester of end of the image recognizing process and instruct start of another process using the process result, and the like by another interrupt or the like. As a result, the burden of the interrupting process of the single central processing unit 2 increases.

(2) In contrast with the case where the image recognition accelerator 9 interrupts all of the central processing units, since the image recognition accelerator 9 itself determines the interrupt issue destination, mask setting to a central processing unit by software is unnecessary.

(3) Since it is unnecessary to recreate a mask register and software (interrupt routine) in accordance with the number of circuit modules such as the central processing units and the image recognition accelerator 9, reusability, that is, compatibility of software related to an interrupting process when the same circuit module is used for different products can be increased.

(4) Since the image recognition accelerator 9 itself determines the interrupt issue destination, it is sufficient for a central processing unit to receive an interrupt issued to itself regardless of the data process status of another central processing unit. Thus, it can contribute to simplicity of hardware for the interrupt control.

Figure 6:
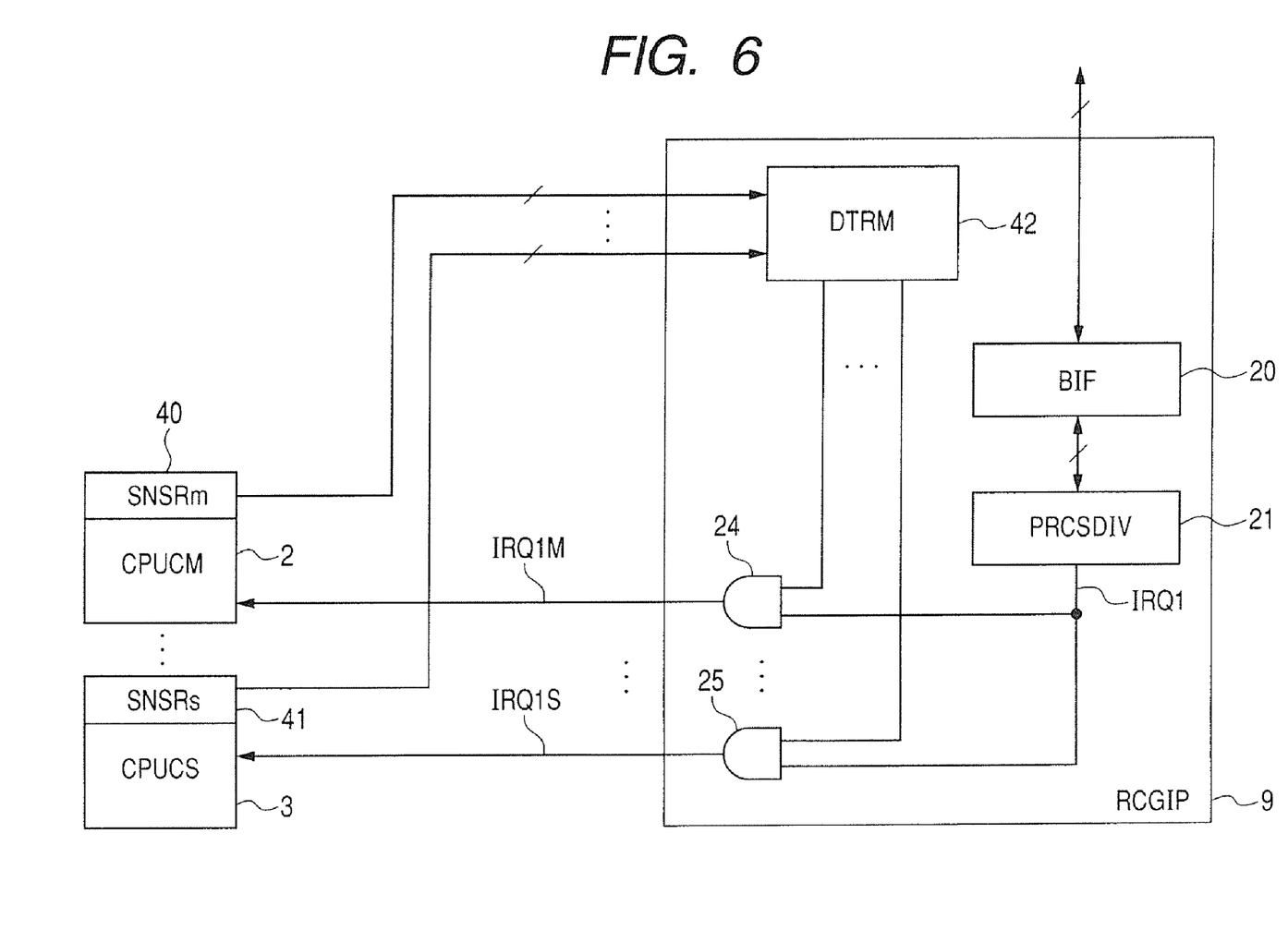
FIG. 6 is a block diagram illustrating a configuration of setting a central processing unit having large operation margin as an interrupt request destination, as a third example of the image recognition accelerator.

FIG. 6 illustrates a configuration of setting a central processing unit having large operation margin as an interrupt request destination, as a third example of the image recognition accelerator 9.

In FIG. 6, the central processing unit 2 has a temperature sensor (SNSRm) 40, and the central processing unit 3 has a temperature sensor (SNSRs) 41. The heat generation amount of the central processing units 2 and 3 changes according to the load of the data process. The heavier the load is, the higher the temperature is. A detection circuit 42 receives temperature detection data of the sensors 40 and 41, and determines a load state of the data process, in other words, an operation state. When the operation margin in the CPUCM 2 is relatively larger, the detection circuit 42 sets an output to the AND gate 24 to the logic value 1 and sets an output to the AND gate 25 to the logic value 0. When the operation margin in the CPUCS 3 is relatively large, the detection circuit 42 sets an output to the AND gate 24 to the logic value 0 and sets an output to the AND gate 25 to the logic value 1. It is sufficient to update the detection result of the detection operation of the detection circuit 42, for example, every plural operation cycles.

Since the image recognition accelerator 9 itself can determine the interrupt issue destination as described above, a central processing unit having light load can be selectively interrupted, and the image recognition accelerator 9 can select the optimum interrupt issue destination by itself. Generally, a core having heavy load has higher temperature. Consequently, by issuing an interrupt to a core having lowest temperature, the interrupt issue destination can be optimally selected.

Although not shown, by monitoring not the load but whether the central processing units operate correctly or not, the invention can contribute to configure a secure system having redundancy. For example, even if one central processing unit fails, by automatically shifting the interrupt destination to another central processing unit, the system which does not depend on the failed central processing unit can be realized. Further, since it is unnecessary to manage the interrupt issue destination by software, the shared part in the software is reduced. From this viewpoint as well, the invention can contribute to realize a securer system. In addition, various methods of selecting an interrupt issue destination can be considered. By properly using the methods in accordance with the object, environment, and state, the optimum central processing unit can be interrupted.

Figure 7:
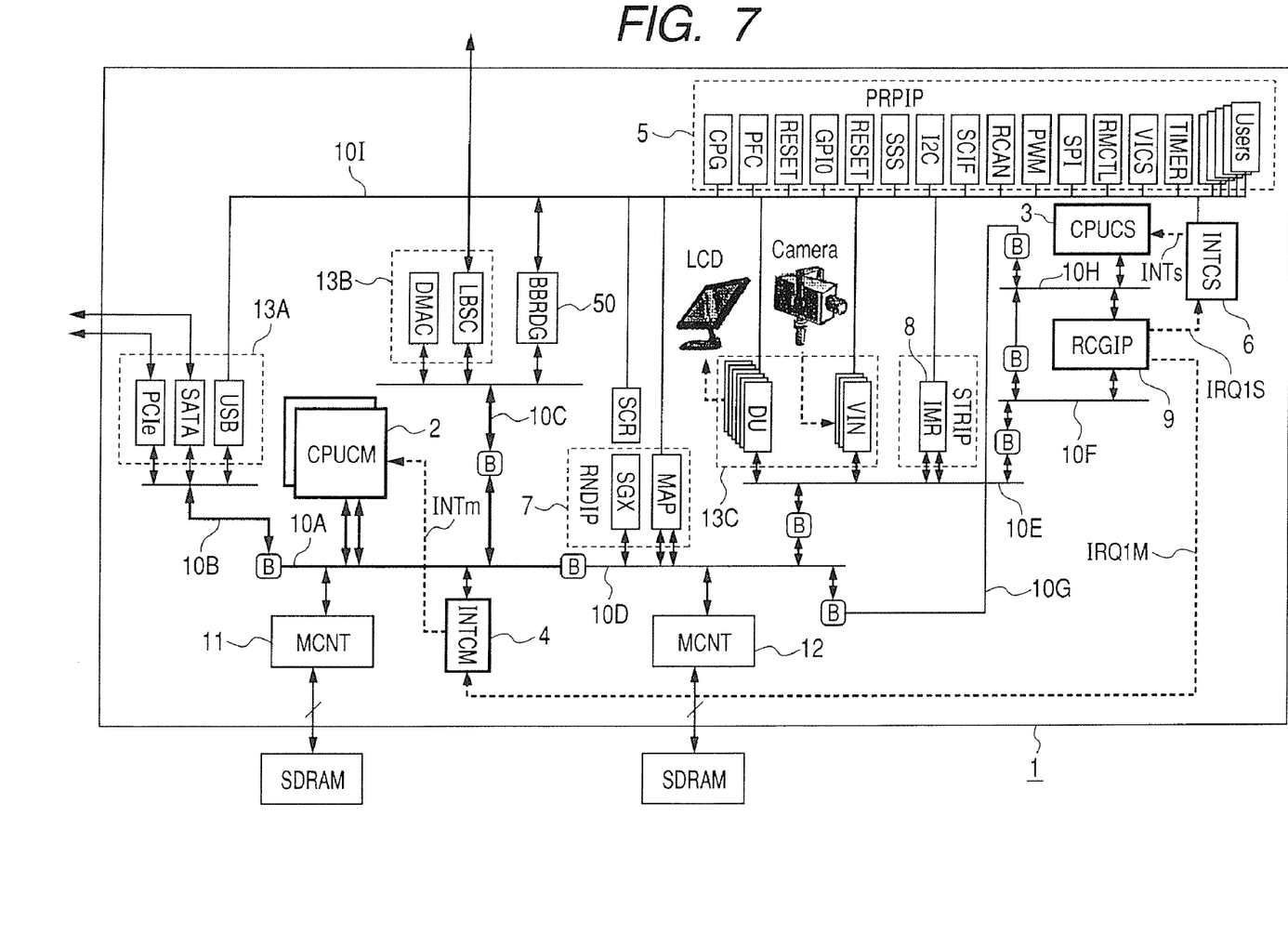
FIG. 7 is a block diagram illustrating another concrete example of the data processing system.

FIG. 7 illustrates another concrete example of the data processing system. The same reference numerals are designated to circuit blocks having the same functions as those of FIG. 1. 13A, 13B, and 13C correspond to the external interface circuit 13. 10A to 10I denote buses which are called the router 10 in FIG. 1. For example, the buses 10A to 10H are split transaction buses which are accessed via a request packet and a response packet. The bus 10I is a peripheral bus in which a bus access is performed by obtaining a bus right to a bus such as an address, data, a control signal, and the like. The bus protocols of both of the buses are made different from each other. Reference numeral 50 denotes a bus bridge circuit (BBRDG) for bus protocol conversion, which interfaces the split transaction bus and the peripheral bus.

Figure 8:
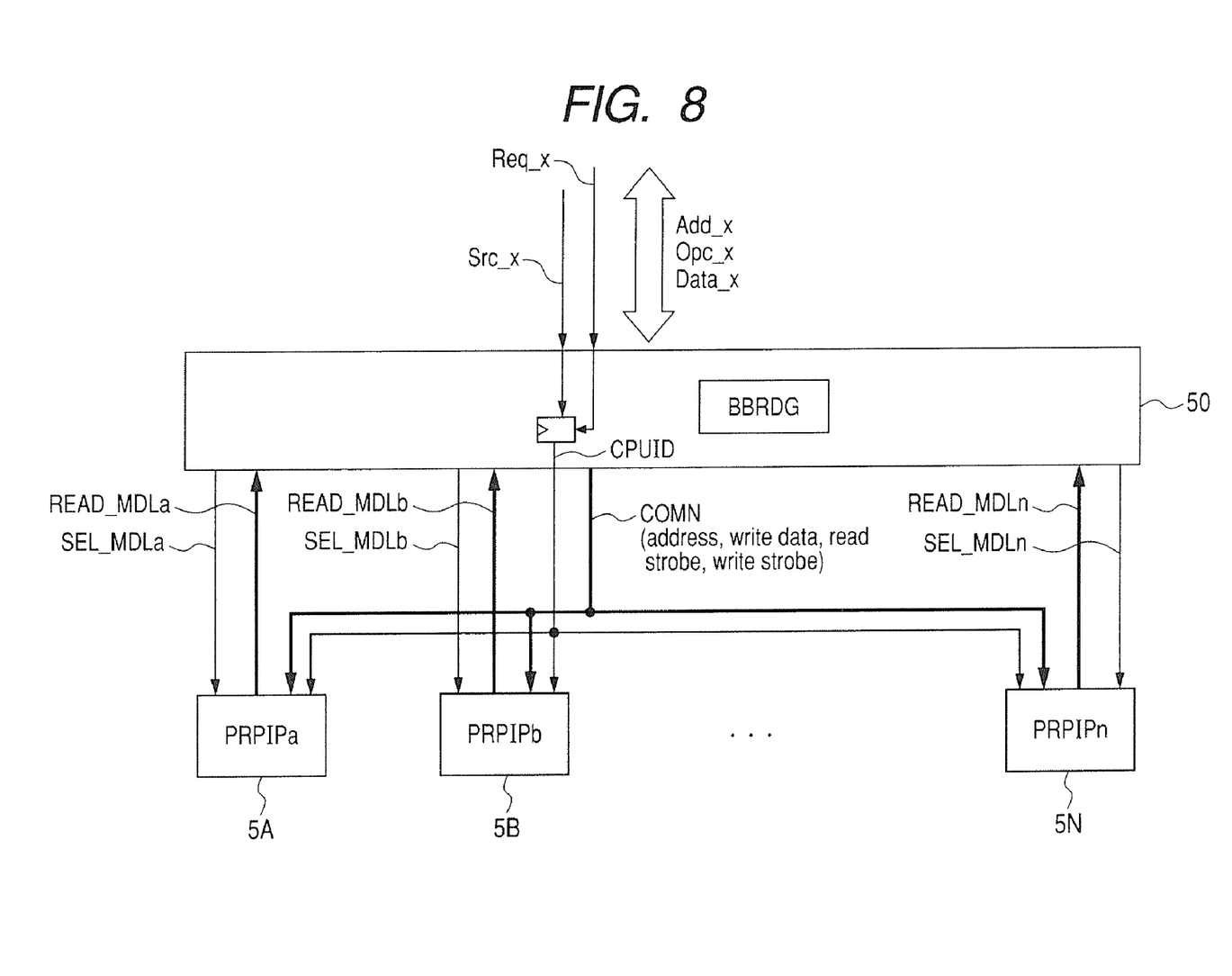
FIG. 8 is a block diagram showing an example of a bus bridge circuit for bus protocol conversion for interfacing a split transaction bus and a peripheral bus.

FIG. 8 shows an example of the bus bridge circuit 50. 5A to 5N denote peripheral circuits. The peripheral bus 10I is configured by, although not limited, a module selection signal SEL_MDLi for each peripheral circuit, a module read bus READ_MDLi for each peripheral circuit, a common bus COMN common to the peripheral circuits, and an ID bus IDB common to the peripheral circuits. The common bus COMN is assigned to signals of address, write data, read strobe, and write strobe. A latch circuit 51 for latching the signal Src_x by a request signal Req_x outputs the latched data as CPU identification data CPUID to an ID bus IDB.

Although the invention achieved by the inventors herein has been concretely described on the basis of the embodiments, obviously, the invention is not limited to the embodiments but can be variously changed without departing from the gist.

The circuit module for outputting an interrupt request signal to a plurality of interrupt controllers is not limited to the image recognition accelerator and may be any of the image drawing accelerator 7, the strain correction accelerator 8, and the peripheral circuit 5. Any of them may output the signal. The circuit module is not limited for the image process but may be for any data process such as encryption/decryption, compression/decompression, and coding/decoding. The data processing system is not limited to an image processing system but may be any other data processing system of encryption/decryption, compression/decompression, and coding/decoding. With respect to the interrupting process procedure, the interrupt cause code may be output from the interrupt request generator. The central processing unit may be grasped as a unit having the functions of executing an instruction and performing data process such as a CPU core or a processor core. Each of the number of central processing units and the number of interrupt controllers is not limited to two but may be proper plural number of three or more. The data processing system is not limited to a single chip but may be configured by multiple chips. On the data processing system, a memory such as an SDRAM may be mounted on the chip.

What is claimed is:

1. A data processing system comprising:
  a plurality of central processing units;
  a plurality of interrupt controllers assigned to the central processing units in a one-to-one corresponding manner; and
  a circuit module which can be commonly used by the central processing units,
  wherein different interrupt request signals are supplied from the circuit module to the interrupt controllers,
  wherein each of the interrupt controllers notifies the corresponding central processing unit of an interrupt in response to the input interrupt request signal,
  wherein the circuit module selects an interrupt controller for supplying an interrupt request signal from the interrupt controllers,
  wherein the circuit module outputs an interrupt request signal toward a single interrupt controller which is preliminarily determined regardless of an interrupt controller corresponding to a central processing unit which issued a start request or regardless of a central processing unit which issued a start request, in accordance with a set value of a first register,
  wherein a second register designates a single interrupt controller for outputting an interrupt request signal regardless of a central processing unit which issued a start request, and
  wherein when a second value is set in the first register, an interrupt controller designated by the set value in the second register is set as an output destination of an interrupt request signal.

2. The data processing system according to claim 1, wherein the circuit module generates an interrupt request signal at the end of a process of responding to an issued start request, on occurrence of an error during the responding process, and at the timing of notifying of a status of the responding process.

3. The data processing system according to claim 1, wherein the circuit module outputs the interrupt request signal toward an interrupt controller corresponding to a central processing unit which issued a start request.

4. The data processing system according to claim 1, further comprising a third register that holds identification data output from a central processing unit as an issuer of a start request when the start request is issued,
  wherein when a first value is set in the first register, an interrupt controller corresponding to the identification data held in the third register is set as an output destination of an interrupt request signal.

5. The data processing system according to claim 1, wherein the circuit module determines operation margin in data process in the central processing units, and sets, as an output destination of an interrupt request signal, an interrupt controller on the side of a central processing unit having large operation margin.

6. The data processing system according to claim 3, wherein the circuit module has a third register that holds identification data which is output from a central processing unit as an issuer of a start request when the start request is issued, and an interrupt controller corresponding to the identification data held in the third register is set as an output destination of the interrupt request signal.

7. The data processing system according to claim 5, wherein the circuit module receives temperature data obtained by measuring temperatures of the central processing units and determines that the lower the temperature is, the larger the operation margin in the data process is.

* * * * *